(12) United States Patent
Shang et al.

(10) Patent No.: US 8,347,044 B2
(45) Date of Patent: Jan. 1, 2013

(54) MULTI-PROCESSOR BASED PROGRAMMABLE LOGIC CONTROLLER AND METHOD FOR OPERATING THE SAME

(75) Inventors: Weihua Shang, Shanghai (CN); Yongzhi Liu, Shanghai (CN); William Henry Lueckenbach, Charlottesville, VA (US); Li Liu, Shanghai (CN); Yu Zhang, Shanghai (CN)

(73) Assignee: General Electric Company, Niskayuna, NY (US)

( * ) Notice: Subject to any disclaimer, the term of this patent is extended or adjusted under 35 U.S.C. 154(b) by 502 days.

(21) Appl. No.: 12/571,142

(22) Filed: Sep. 30, 2009

(65) Prior Publication Data
US 2011/0077749 A1    Mar. 31, 2011

(51) Int. Cl.
*G06F 12/00*    (2006.01)
(52) U.S. Cl. ............. 711/151; 711/158; 700/7; 713/375
(58) Field of Classification Search .................. 711/151, 711/158; 700/7; 713/375
See application file for complete search history.

(56) References Cited

U.S. PATENT DOCUMENTS

| 4,751,672 | A | * | 6/1988 | Yamada ............................ 700/7 |
| 5,454,095 | A | | 9/1995 | Kraemer et al. |
| 5,465,368 | A | | 11/1995 | Davidson et al. |
| RE36,263 | E | | 8/1999 | Janke et al. |
| 7,774,073 | B2 | | 8/2010 | Cane et al. |
| 2009/0106755 | A1 | | 4/2009 | Chandhoke |
| 2009/0106761 | A1 | | 4/2009 | Chandhoke |

FOREIGN PATENT DOCUMENTS

| DE | 3718639 A1 | 12/1988 |
| EP | 1801676 A1 | 6/2007 |

OTHER PUBLICATIONS

PCT International Search Report dated Dec. 3, 2010 and Written Opinion.
Veen, Arthur H., Dataflow Machine Architecture, ACM Computing Survey, vol. 18, No. 4, Dec. 1986, pp. 365-396.
PCT International Search Report and Written Opinion dated Dec. 10, 2010, for PCT/US2010/049468 pp. 1-17.
PCT International Search Report dated Dec. 3, 2010 and Written Opinion, pp. 1-17.

* cited by examiner

*Primary Examiner* — Stephen Elmore
(74) *Attorney, Agent, or Firm* — Scott J. Asmus

(57) ABSTRACT

A programmable logic processor (PLC) with multiple PLC functions is disclosed. The PLC includes at least one memory storing at least one of a plurality of programs or data, and one or more processor assigned to each of the PLC function and couple to the memory. The PLC functions are run in parallel. A method of operating the PLC and a PLC system with multiple processors are also disclosed.

22 Claims, 14 Drawing Sheets

US 8,347,044 B2

MULTI-PROCESSOR BASED PROGRAMMABLE LOGIC CONTROLLER AND METHOD FOR OPERATING THE SAME

BACKGROUND

This invention generally relates to a programmable logic controller (PLC), and more particularly to a multi-processor based PLC and a method for operating the multi-processor based PLC.

Programmable logic controllers are widely used in various industries for logic control, sequence control, motion control, process control, distributed system control and so on. A programmable logic controller (PLC) generally has one or more processors, a memory, and a plurality of input/output (IO) modules coupled to devices. The processors are the heart of the PLC and responsible for many PLC functions, such as input scanning, logic solving and output scanning. It is also noted that there may be multiple processors associated with each PLC function. Therefore, choosing suitable processors help to achieve a PLC with high performance.

The duration of a sweep cycle and the speed of logic solving are two parameters typically used to measure the efficiency of a PLC. FIG. 1 schematically shows a sweep cycle of a conventional PLC 100. The PLC 100 typically includes multiple PLC functions such as input scanning, logic solving, and output scanning. Besides input scanning, logic solving and output scanning, other PLC functions may be included depending on the application. All PLC functions are typically carried out in serial sequence wherein each function is processed in its entirety before proceeding to another function. The subsequent un-processed PLC functions thus remain in a waiting stage or queue until the prior function is finished. Accordingly, the duration of the total sweep cycle 6 is the sum of the durations of all individual cycle times 1, 2, 3, 4 and 5 of the PLC functions as well as any time in-between the respective cycle times 7. The serial processing of the individual PLC functions results in a lower efficiency of the PLC.

Therefore, there is a need for an improved PLC with high efficiency to meet practical requirements and applications.

BRIEF DESCRIPTION

In one aspect of the invention, a programmable logic processor (PLC) capable of a plurality of PLC functions is provided. The PLC comprises one or more processors assigned to each of the PLC functions, and at least one memory coupled to the processors and storing at least one of a plurality of programs or data. At least two of the PLC functions are run in parallel.

In another aspect of the invention, a method of operating a PLC with a plurality of PLC functions is provided. The PLC comprises one or more processors assigned to each of the PLC function and coupled to the memory, and at least one memory storing at least one of a plurality of programs or data. The method comprises: (a) initializing the processors corresponding to each of the PLC functions simultaneously; (b) running the PLC functions in parallel by using the processors to execute the corresponding programs in current sweep cycle; (c) exchanging data in parallel by using the processors in current sweep cycle; and (d) switching the processors to step (b) in next sweep cycle to periodically perform steps (b), (c) and (d) until the processors respectively finish all required programs.

In another aspect of the invention, a PLC system is provided. The PLC system comprises a plurality of programmable logic controllers (PLCs) each of which is capable of a plurality of PLC functions; a plurality of systems links connecting the PLCs; and a plurality of IO interfaces connecting the PLCs with one or more devices. Each PLC comprises one or more processors assigned to each of the PLC functions, and at least one memory coupled to the processors and storing at least one of a plurality of programs or data. At least two of the PLC functions are run in parallel.

These and other advantages and features will be more understood from the following detailed description of preferred embodiments of the invention that is provided in connection with the accompanying drawings.

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

It is known that programmable logic controllers (PLCs), programmable automation controllers (PACs), and distributed control systems (DCSs) are overlapping in functions. The boundary among them is more and more ambiguous. Thus, the term PLC referred to herein is not limited to its original meaning and means all equipments having the similar capabilities and functionality, such as the PACs and DCSs.

The suffix "(s)" as used in drawings is usually intended to include both the singular and the plural of the term that it modifies, thereby including one or more of that term.

Figure 1:
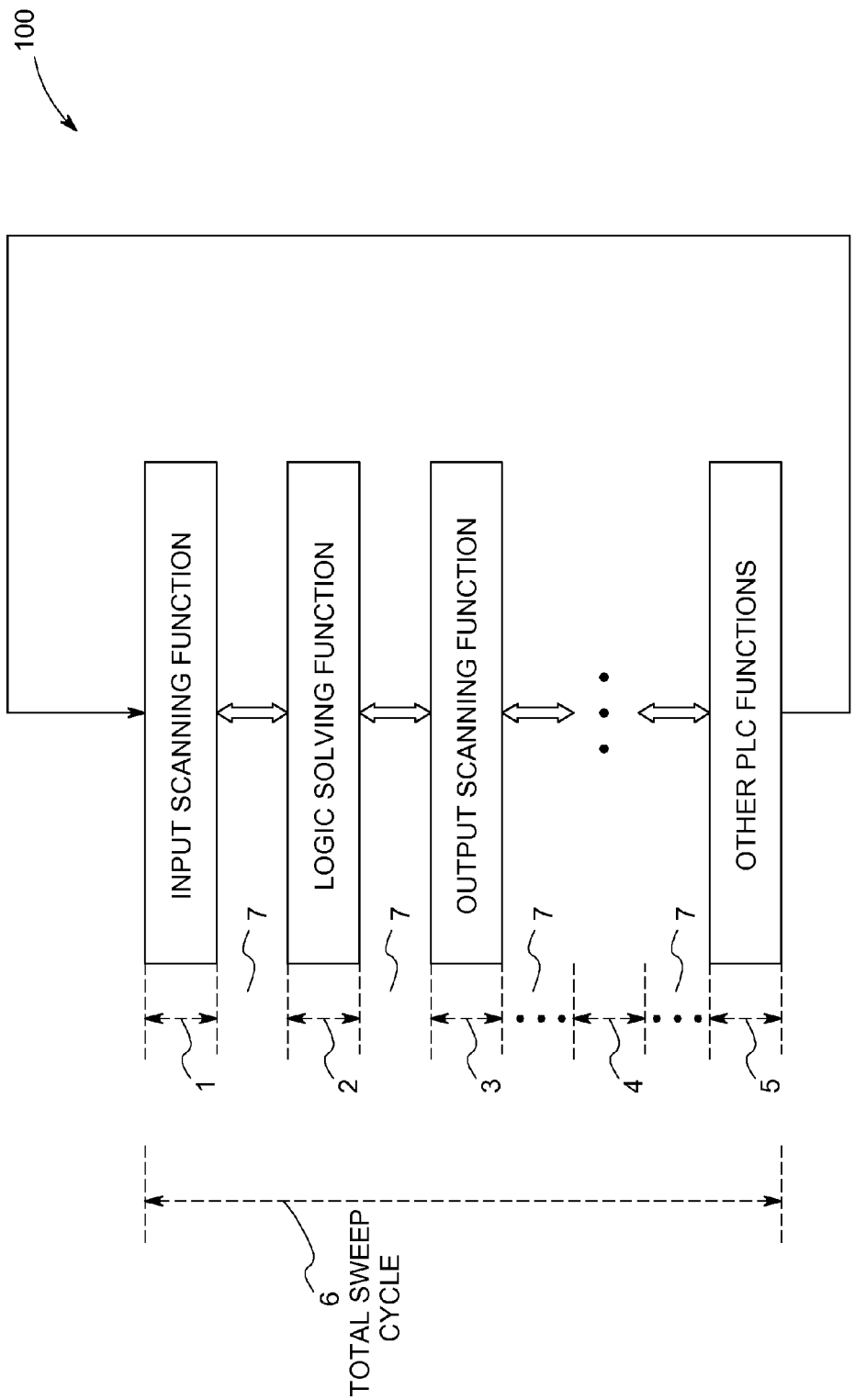
FIG. 1 is a schematic block diagram showing a sweep cycle of a conventional programmable logic controller (PLC)
Figure 2:
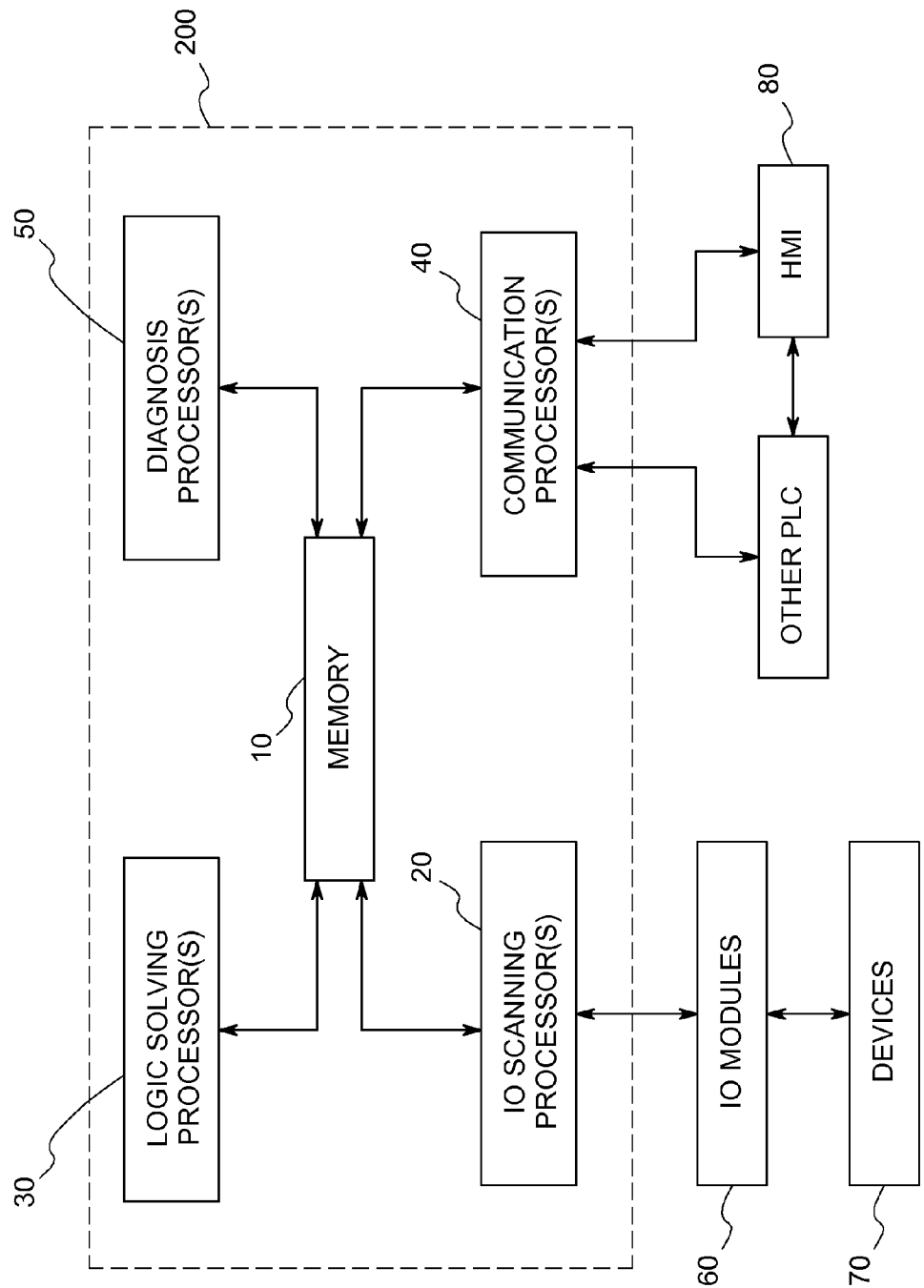
FIG. 2 is a schematic block diagram of a PLC in accordance with one embodiment of the invention.

A programmable logic controller (PLC) 200 in accordance with one embodiment of the invention is shown in FIG. 2. The PLC 200 exchanges data with devices 70 such as sensors or driving actuators for acquiring data, controlling motion, or the like. The PLC 200 typically has one or more processors and at least one memory 10 coupled to the processors. The memory 10 typically stores a plurality of programs, intermediate results and related data. The processors in this embodiment include an IO scanning processor 20, a logic solving processor 30, a communication processor 40 and a diagnosis processor 50, each of which carries out one PLC function. Within each processor 20, 30, 40, 50 there may be one or more processors that also may run in parallel. The processors 20, 30, 40, 50 can be portion of one or multiple processor assemblies that contain many processors.

It should be noted that the present invention is not limited to any particular processor. The term "processor", as that term is used herein, is intended to denote any unit, module, machine and other form capable of performing programs. The term "processor" is intended to denote any unit, module, machine and other form that is capable of receiving an input and of processing the input in accordance with prescribed rules to produce an output, as will be understood by the skilled in the art.

The PLC 200 further includes a plurality of channels which join the processors together to allow them to communicate with each other. In some embodiments, the channels may be not employed. The processors 20, 30, 40, 50 run in parallel to fulfill the corresponding PLC functions so that the efficiency of the PLC is highly improved.

Referring again to FIG. 2, the IO scanning processor 20 is connected with one or more devices 70 through one or more input/output (IO) modules 60 having input modules and output modules. The IO scanning processor 20 scans the devices 70 or the associated processors to acquire input data or transmit output data. In some embodiment, the IO scanning processor 20 is replaced by an input scanning processor and an output scanning processor. The logic solving processor 30 performs logic computation whose results go to the IO scanning processor 20, the diagnosis processor 50 or the communication processor 40. The communication processor 40 is connected with a human machine interface (HMI) 80 via system links such as low voltage differential signal (LVDS). The communication processor 40 exchanges data with other processors and receives request from the HMI 80. The HMI 80 is also referred to as a host computer, MMI (Man Machine Interface) and GUI (Graphical User Interface). The communication processor 40 also communicates with the HMI 80 via other PLC via system links. The diagnosis processor 50 performs routine check of PLC hardware and maintains a fault table in the memory 10.

Figure 3:
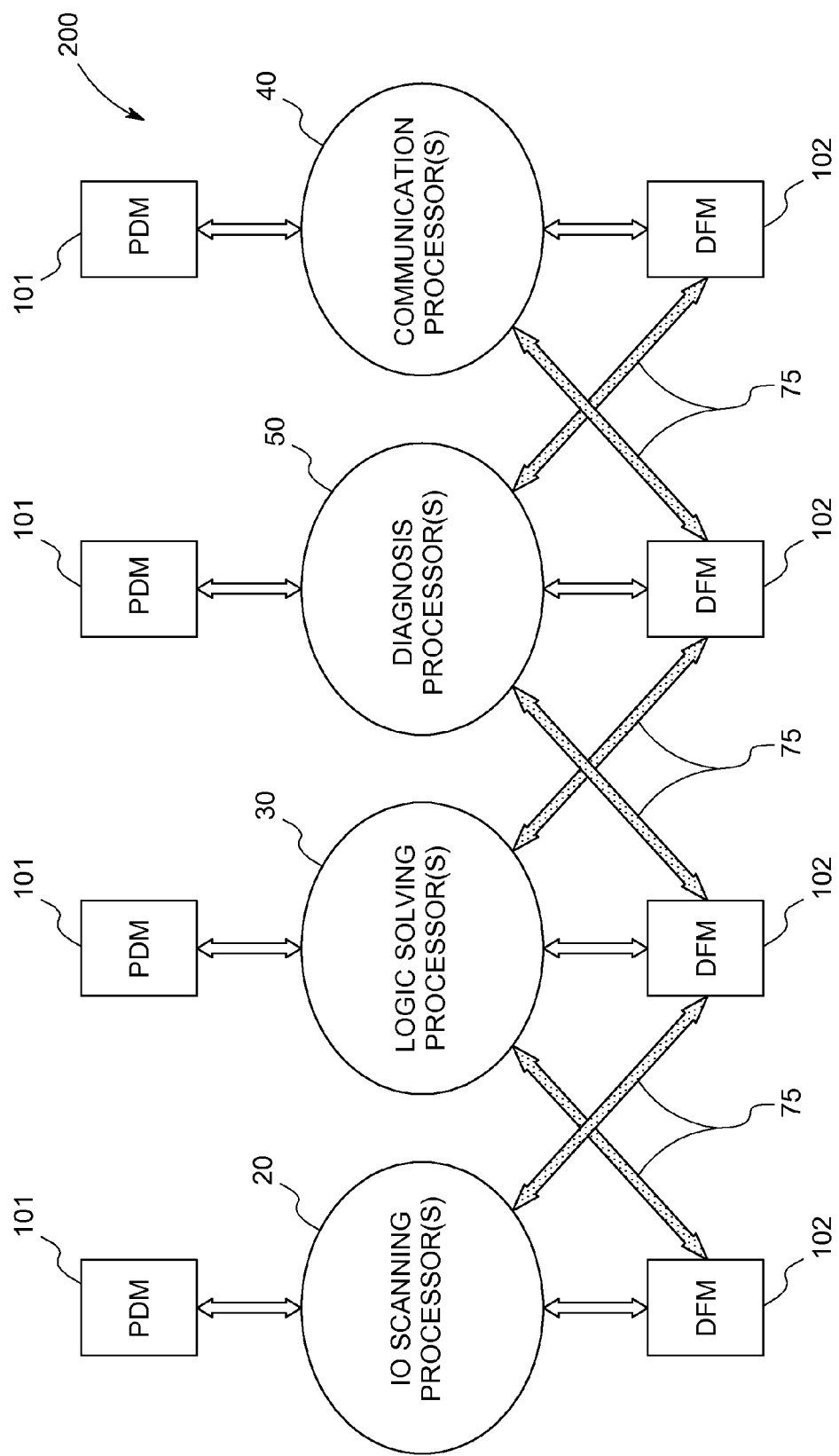
FIG. 3 is a schematic block diagram illustrating hardware architecture of the PLC in FIG. 2.

FIG. 3 illustrates hardware architecture of the PLC 200 in FIG. 2 according to one embodiment. The memory 10 has multiple sections of memories, which are respectively realized by program and local data memories (PDMs) 101 and dataflow memories (DFMs) 102. Each of the processors 20, 30, 40 and 50 has an associated PDM 101, a directly associated DFM 102 (local DFM) and three indirectly associated DFMs (external DFMs). The PDM 101 is divided into a program memory for storing system programs or user programs and a local data memory for storing intermediate results. The DFM 102 is a pool of dataflow variables. The dataflow variable has a data value and an associated tag that indicates the presence or absence of the data value.

FIG. 3 also shows the relationship among the four processors 20, 30, 40 and 50, the PDMs 101 and the DFMs 102, without showing full connections between the four processors 20, 30, 40 and 50 and their external DFMs 102. Each of the processors 20, 30, 40 and 50 has full access to its associated PDM 101 and its local DFM 102. When the dataflow variable stored in its external DFMs 102 is desired, the processors 20, 30, 40 and 50 take an indirect approach via the channels 75 complying with a predefined inter-processor communication protocol, as shown by the 45 degrees arrows. The channels 75 may be realized by some signals or shared memories, such as multiport memory, ping-pong buffer or first-in-first-out (FIFO). In this embodiment, the FIFO is adopted to link the processors.

Figure 4:
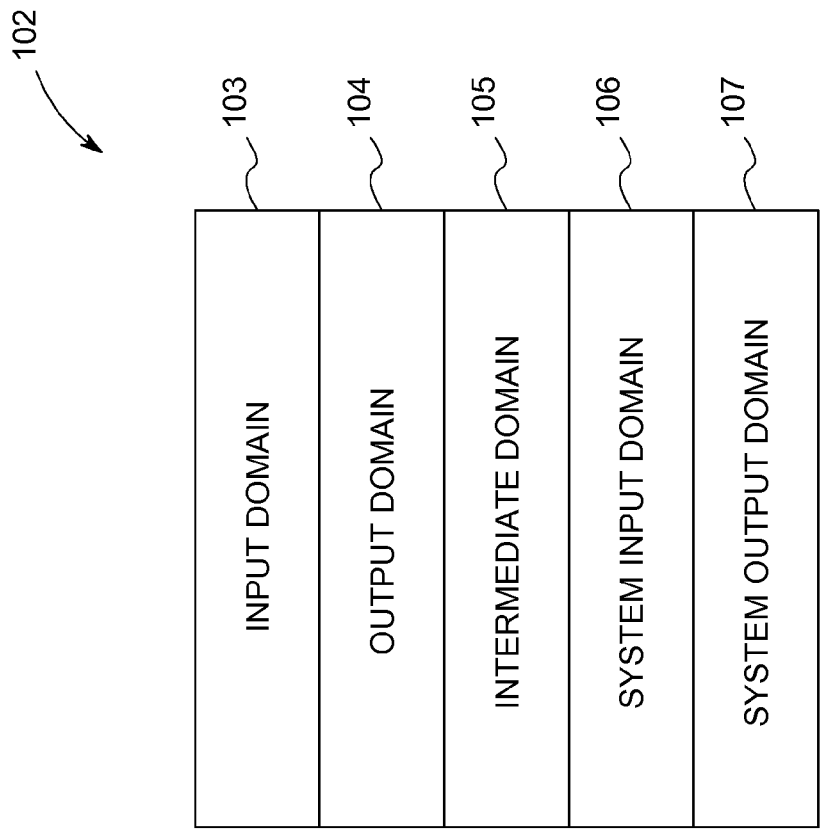
FIG. 4 is a schematic block diagram illustrating the structure of dataflow memories (DFMs) in FIG. 3.

Referring to FIG. 4 in conjunction with FIGS. 2 and 3, according to different types of stored data value, the DFMs 102 for providing spaces for dataflow variables are separated into several domains, such as input domain 103, output domain 104, intermediate domain 105, system input domain 106 and system output domain 107. The input domain 103 is for storing input data from the devices 70 through the input modules. The output domain 104 is for storing output data. The intermediate domain 105 is for storing local or intermediate data of its local PLC. The system input domain 106 is for storing input data from other PLC or the HMI 80 through the system links. The system output domain 107 is for storing output data to other PLCs though the system links. At least one DFM also includes one domain for storing data (not shown). For example, the local DFM 102 of the IO scanning processor 20 has input domain 103 and output domain 104; and the local DFM 102 of the communication processor 40 has the system input domain 106 and system output domain 107. In some embodiments, one domain is a group of small domains distributed in the processors 20, 30, 40 and 50.

In this embodiment, all processors 20, 30, 40 and 50 of the PLC 200 run in parallel so that sweep cycles are shorter than the conventional PLC. A sweep cycle typically consists of a synch phase and a run phase. In synch phase, all processors 20, 30, 40 and 50 send data to their destinations and receive data from other processors. The programs in the PLC are typically periodical and predetermined such that dataflow direction and data packet size are determined in system configuration according to application requirements. In the run phase, all processors 20, 30, 40 and 50 perform the corresponding programs to fulfill their PLC functions. During the run phase, some intermediate results are produced and placed in the associated PDMs 101; meanwhile, the DFMs 102 are updated. In this embodiment, the duration of one sweep cycle is determined by the largest PLC function that is typically performed by the logic solving processor 30.

The processors 20, 30, 40 and 50, in one embodiment, switch between the synch phase and the run phase in compliance with a synch-run switch format and any of three run-synch switch formats described herein. The synch-run switch format is that the processors 20, 30, 40 and 50 individually switch from synch phase to run phase when all data is sent and the data they require is received. For the first run-synch switch format, the processors 20, 30, 40 and 50 individually switch from run phase to synch phase when they finished their corresponding programs. For the second run-synch switch format, the processors 20, 30, 40 and 50 simultaneously switch from run phase to synch phase when a predefined maximum period (T_max) of execution is reached. For the third run-synch switch format, the processors 20, 30, 40 and 50 simultaneously switch from run phase to synch phase when all processors 20, 30, 40 and 50 finish their corresponding programs.

Figure 5A:
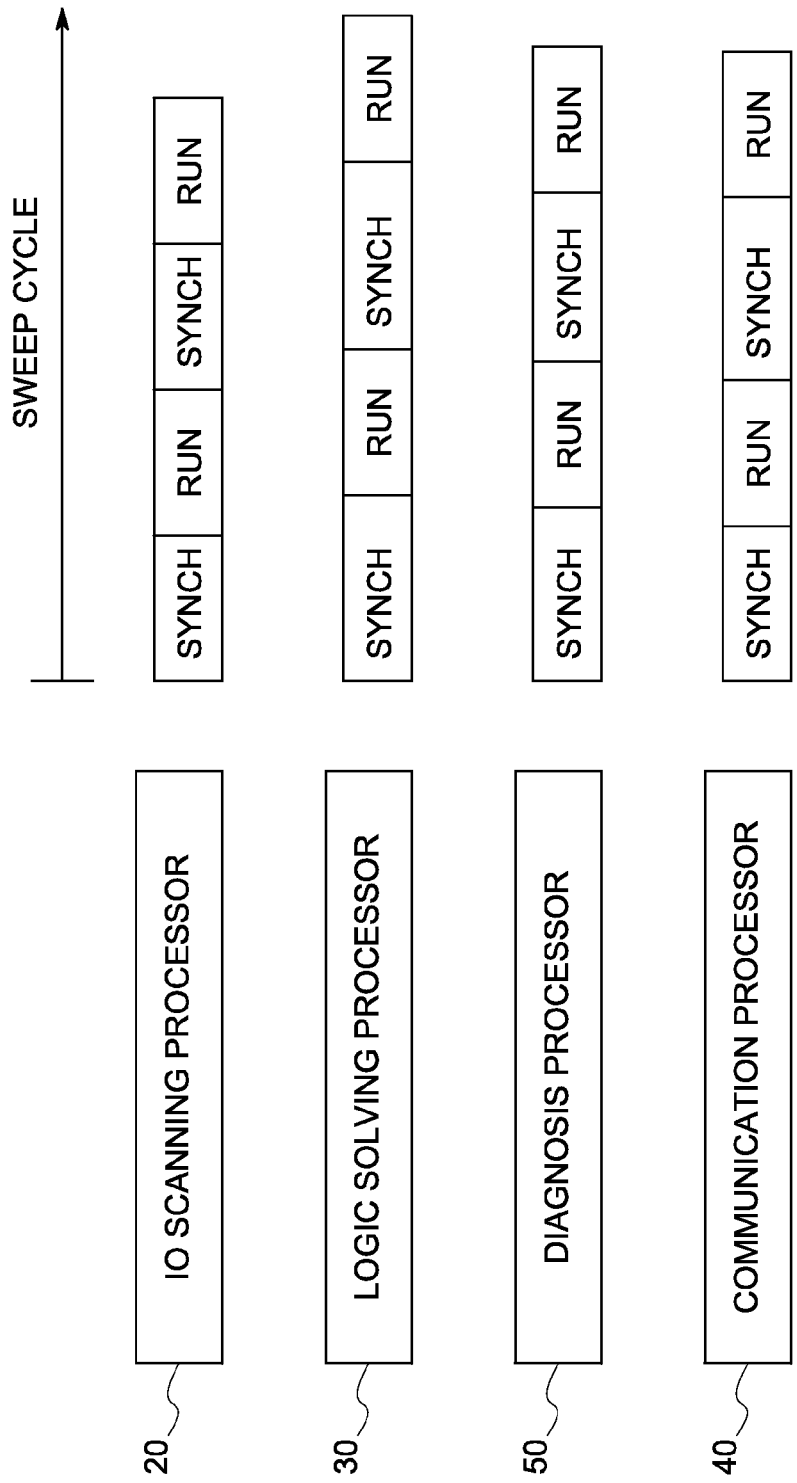
FIG. 5A is a schematic timing diagram of the PLC in FIG. 2, applying a first run-synch phase switch format.

FIG. 5A shows sweep cycles of the PLC 200 in FIG. 3 adopting the first run-synch phase switch format. Because the processing speeds of the processors 20, 30, 40 and 50 or the number of data packet from/to the processors may be different, the switching point from synch phase to run phase may not be aligned perfectly. All processors 20, 30, 40 and 50 run in parallel in their individual sweep cycles and the individual switching occurs at the completion of the respective PLC function. The cycle time in this example can be considered as the time for completion of the individual cycle time of the longest processor function. The first run-synch phase switch format is simple to implement, thereby achieving the most efficient PLC.

Figure 5B:
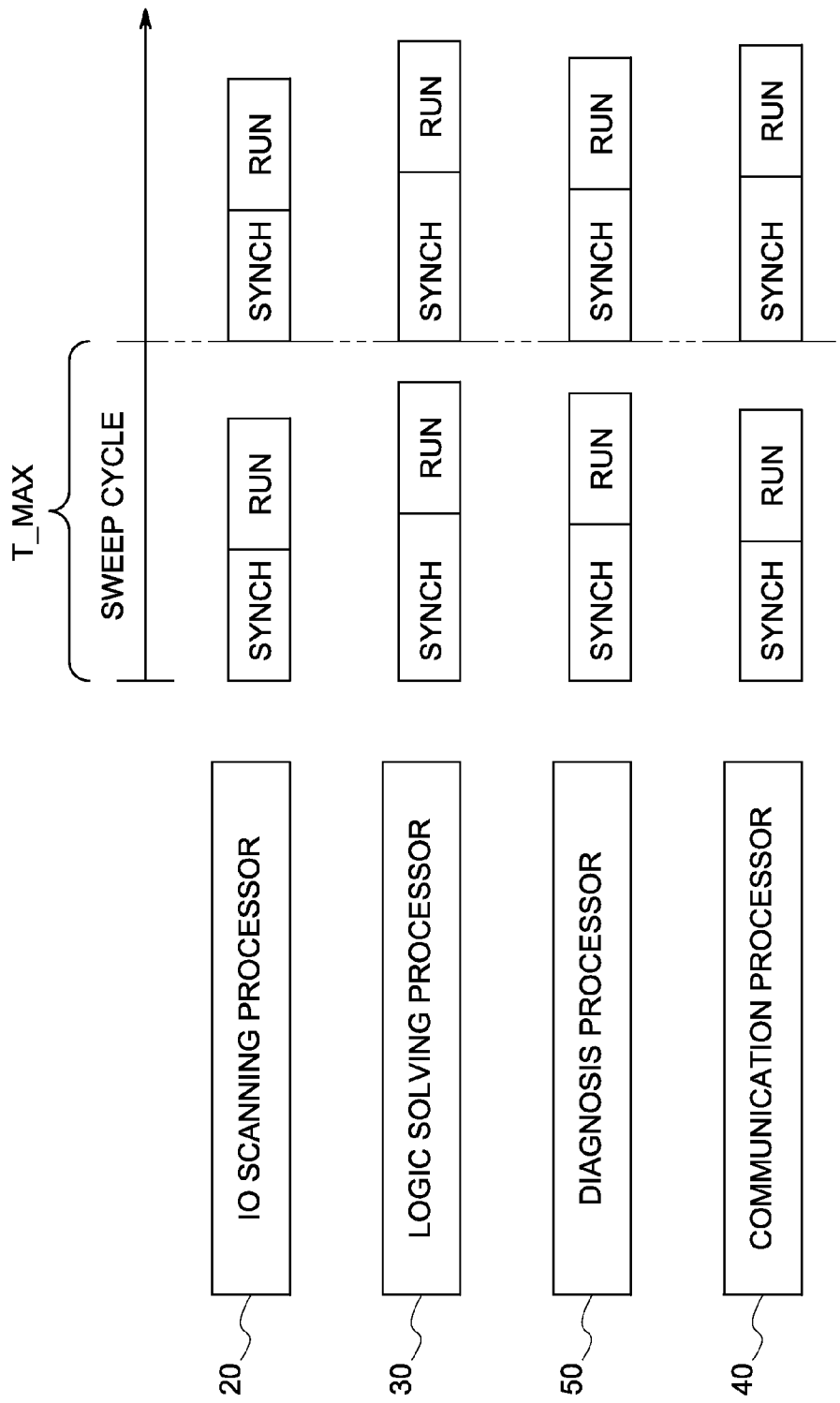
FIG. 5B is a schematic timing diagram of the PLC in FIG. 2, applying a second run-synch phase switch format.

FIG. 5B shows sweep cycles of the PLC 200 in FIG. 3 adopting the second run-synch phase switch format. In this case, the processors 20, 30, 40 and 50 perform the processing and the next cycle commences after a predefined time period T_max or completion of all tasks in the current cycle. The predefined time period T_max can be determined by simulation or empirically derived such that all of the PLC processing is completed before the next cycle. There is typically a small delay between the cycle time of the individual PLC functions and the predefined time period T_max. The small delay is typically calculated to be within a tight margin of the typical or average time of the longest individual PLC function processing time. In most applications, the logic solving function is placed at the highest priority. Sometimes T_max is indicated that the largest sweep time at most is T_max, for avoiding endless execution of other functions. For example, when the communication processor 40 requires a huge amount data, the run phase could be very long. Under such situation, when T_max is violated by any function, a warning or a fault will be generated.

Figure 5C:
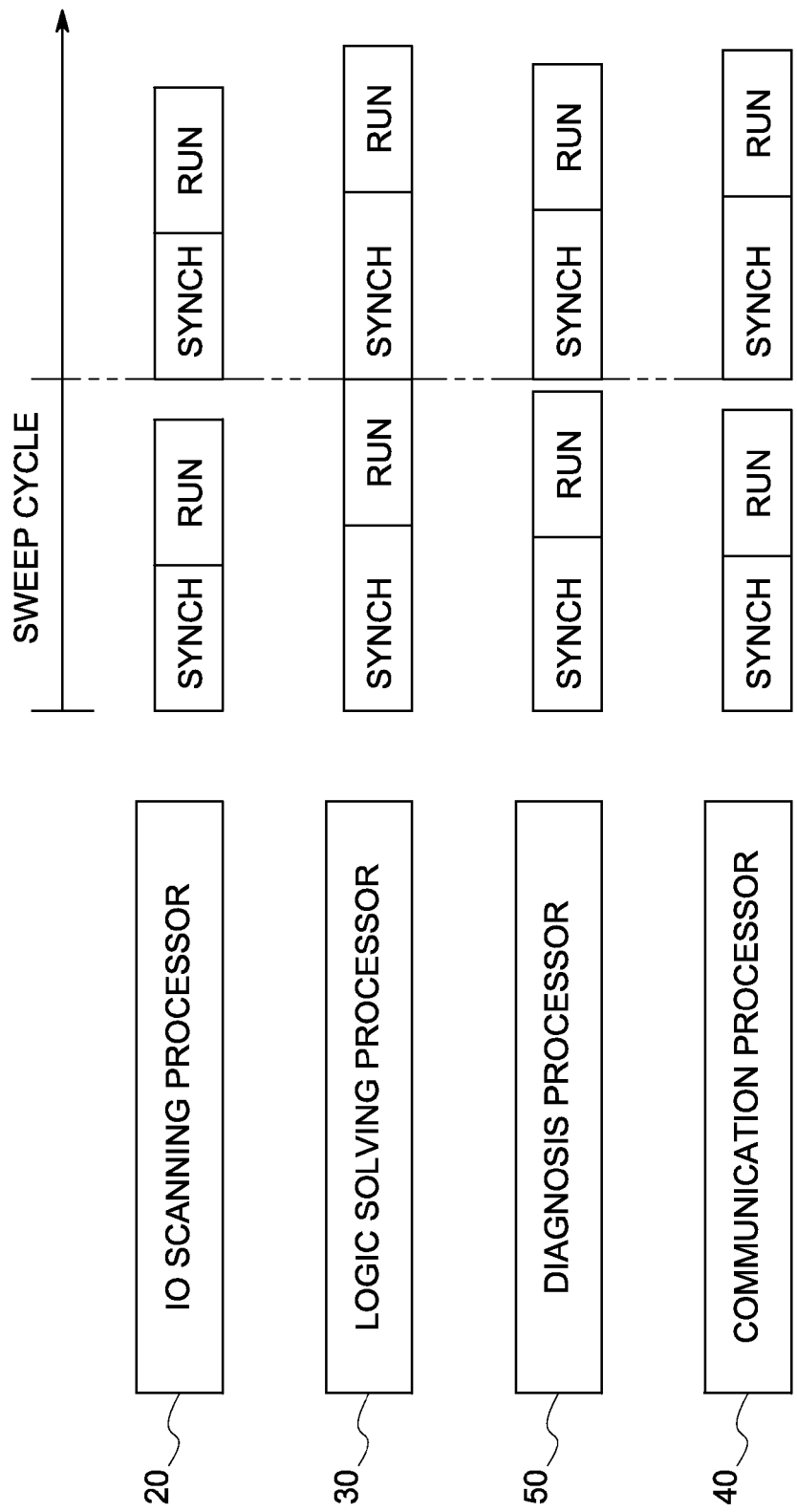
FIG. 5C is a schematic timing diagram of the PLC in FIG. 2, applying a third run-synch phase switch format.

FIG. 5C shows sweep cycles of the PLC 200 in FIG. 3 adopting the third run-synch phase switch format. In this embodiment, the processors 20, 30, 40 and 50 simultaneously switch from run phase to synch phase when the longest individual PLC processing time is completed. In this example, the logic solving processor 20 is the longest cycle time. In this embodiment the duration of one sweep cycle is the largest execution period among the processors 20, 30, 40 and 50. In contrast, the duration of one sweep cycle of the conventional PLC is the sum of all processors, and the invention achieves highly efficiency. There also have many functions. As depicted herein, the logic solving function is placed at the highest priority in most applications. The third run-synch phase switch format is generally used when the processing time of a logic solving function is pre-estimated to be not shorter than other PLC functions.

Figure 6:
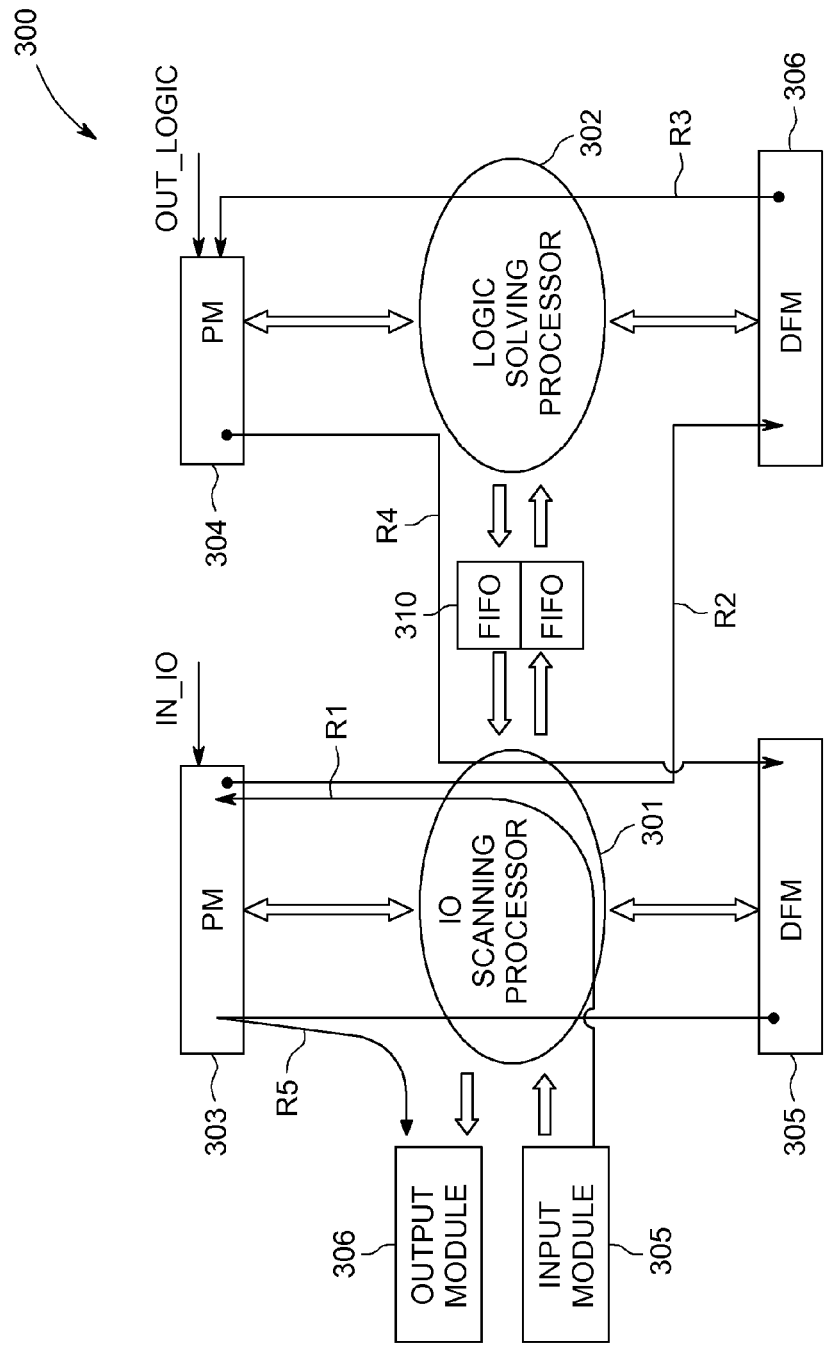
FIG. 6 is a schematic block diagram illustrating dataflow in a PLC in accordance with another embodiment of the invention.

In order to better understand the parallel performance of the present system, several examples of dataflow models are described herein. Referring to FIG. 6, a PLC 300 having two processors, namely IO Scanning Processor and Logic Solving Processor, is taken as an example. The PLC 300 has an IO scanning processor 301, a logic solving processor 302, and memory. The memory in this embodiment includes PDMs 303 and 304 and DFMs 305 and 306 each of which are respectively associated with the IO scanning processor 301 and the logic solving processor 302. The IO scanning processor 301 and the logic solving processor 302 are connected together by multiple channels such as a plurality of FIFOs 310. In some embodiments, the FIFOs 310 are replaced by other types of channels.

The symbols "in_io" and "out-logic" are indicative of intermediate results respectively produced by the IO scanning processor 301 and the logic solving processor 302. Various arrows mean the directions of dataflow. There are fives routes described herein which are expressed as R1, R2, R3, R4 and R5.

R1 indicates that the IO scanning processor 301 receives data from devices via input modules 307 and produces the intermediate result in_io. R2 indicates that the intermediate result in_io is transmitted and placed in the DFM 306 in the form of dataflow variables. The dataflow variables have a tag and data value. The tag generally appears in the form of integer. If the tag shows zero, the logic solving processor 302 cannot access dataflow variables in the corresponding DFM 306. Once there is data transmitted into the DFM 306, the tag changes to an integer greater than zero so that the logic solving processor 302 is permitted to access dataflow variables.

R3 indicates that the logic solving processor 302 performs user programs using the dataflow variable in the DFM 306 to produce the intermediate result out_logic and then place them in the corresponding PDM 304. R4 indicates that the intermediate result out_logic is sent to IO scanning processor 301 and then to be placed in the DFM 305 via the FIFOs 310. R5 indicates that the IO scanning processor 301 sends dataflow variables in the DFM 305 to output modules 308.

In this embodiment, the FIFOs 310 are used to connect the IO scanning processor 301 with the logic solving processor 302. In some embodiments, the channels, such as the FIFOs 310, are used to connect the processors with their external DFMs. Taking R2 in the PLC 300 from FIG. 6 as an example, in this embodiment, the IO scanning processor 301 acquires the intermediate result in_io from the FIFO 310, and then places the intermediate result in_io to the DFM 305. In some embodiments, the FIFO 310 connects the logic solving processor 302 with the DFM 305 instead of the IO scanning processor 301. As a result, the intermediate result in_io are directly placed the DFM 305 through the FIFO 310, thereby leaping over the IO scanning processor 301. It is also noted that R4 may applies the similar manner as the R2 to be realized.

The five routes are arranged in two phases. According to the above-mentioned definition of the two phases, the routes R2 and R4 are executed in parallel in the synch phase, and the routes R1, R3 and R5 are executed in parallel in the run phase. The dataflow model in FIG. 6 efficiently helps the PLC functions: the IO scanning and logic solving are run in parallel by the IO scanning processor 301 and the logic solving processor 302.

Figure 7:
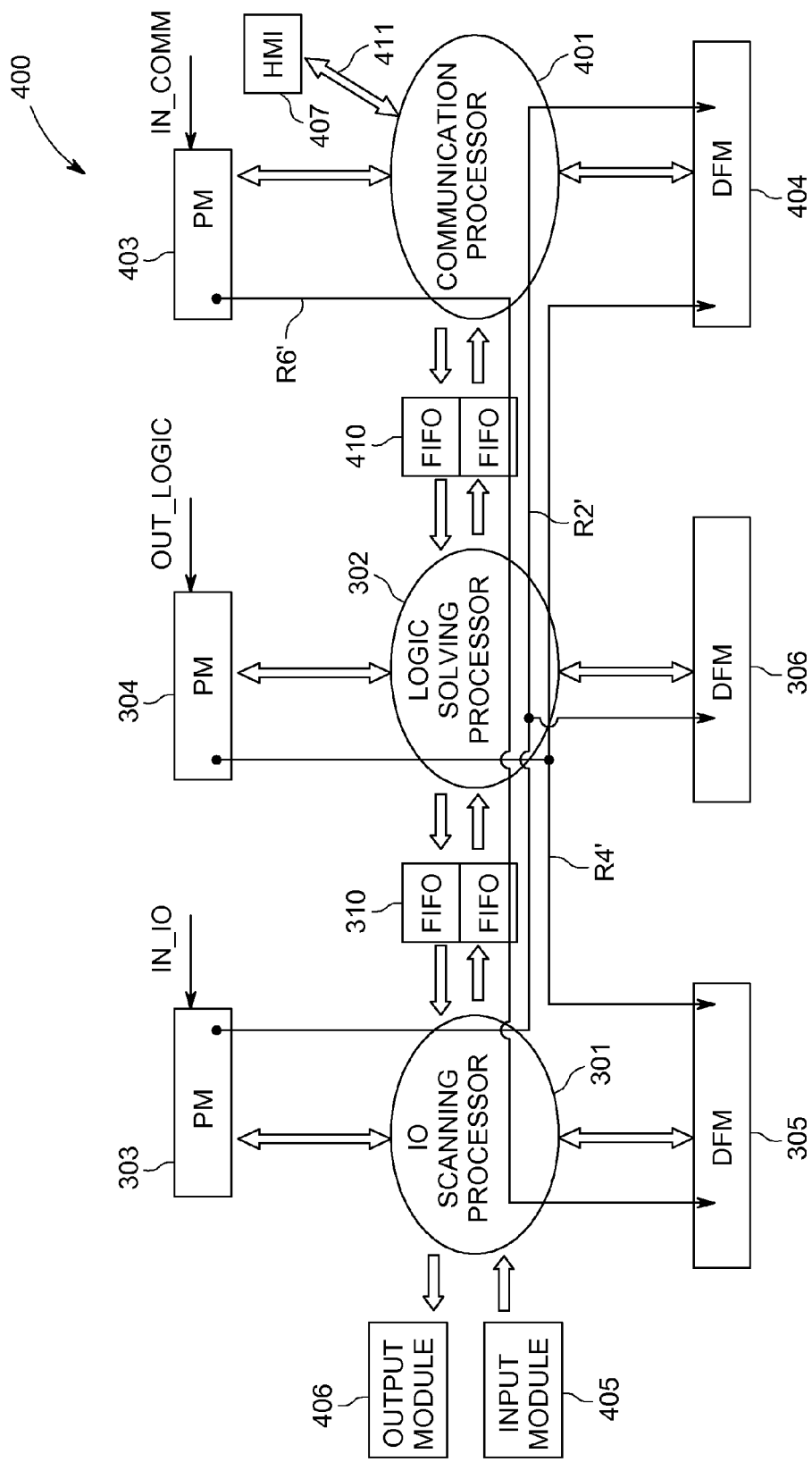
FIG. 7 is a schematic block diagram illustrating dataflow in a PLC in accordance with another embodiment of the invention.

Referring to FIG. 7, the PLC 400 has the similar arrangement with that of the PLC 300 from FIG. 6, but further has a communication processor 401 which connects the PLC 400 with a HMI 407 via a system link 411. FIG. 7 illustrates how the communication processor 401 exchanges data among the processors 301 and 302 during its synch phase. Some routes shown in FIG. 6 and a connection between the communication processor 401 and the IO scanning processor 301 are ignored for the sake of simplicity in FIG. 7. In the PLC 400, the memory includes PDM 403 and DFM 404 which is associated with the communication process 401. The symbol "in_comm" is indicative of intermediate result corresponding to the communication processor 401.

Routes R2', R4' and R6' express data flows in the synch phase. R2' indicates that the intermediate result in_io is transmitted and placed in the DFMs 306 and 404 in the form of dataflow variable. R4' indicates that the intermediate result out_logic is sent to IO scanning processor 301 and the communication processor 401 and then to be placed in the DFMs 305 and 404.

R6' indicates that the intermediate result is transmitted to the IO scanning processor 301 and then to be placed in the DFM 306. In run phase, the communication processor 401 receives request from the HMI 407 via the system link 411 such as LVDS and decodes the requests. At the same time, the data from the IO scanning process 301 or/and the logic solving process 302 in the DFM 404 are packed and sent out over the system link 411 to the HMI 407. As a result, the communication processor 401 periodically transmits the updated data of devices through the IO scanning processor 301 and the logic solving processor 302. Also, the communication processor 401 continually receives request from the HMI 407 to update the status of the devices.

As above-mentioned, in some embodiments, the FIFOs 310 connects the logic solving processor 302 with the DFM 305 instead of the IO scanning processor 301 (shown in FIGS. 6 and 7), thereby directly sending the intermediate result in_io to the DFM 305. It should be understood herein that R2', R4' and R6' can be realized in the same manner.

The DFM 404 has a system input domain and a system output domain whose space are generally limited. When huge amount data must be uploaded over a predetermined threshold value, a data block may take place. Therefore, in some embodiments, a scheduler is provided in a communication processor. When a large amount data are to be uploaded over the predetermined threshold value, the scheduler is triggered to dispatch the uploading request and enable it to upload the data in consecutive cycles.

Programs performed by a logic solving processor are defined as user programs which may be large and computation intensive, typically. A sweep cycle is determined by the execution of the logic solving processor. In order to reduce the processing duration of the logic solving processor, in some embodiments, a PLC is configured with a plurality of logic solving processors jointly performing the user programs. In these embodiments, the user programs are divided into a group of small pieces which are executed on the logic solving processors in parallel. The group of small pieces may have different priorities. An assigner may be provided for dividing the user programs into the small pieces according to the priorities or other suitable standards. In some embodiments, the assigner is arranged in a memory in the PLC, or configured as a separate member in the PLC. Although dataflow in some embodiments where a PLC has four or more PLC functions is not described here, it can be understood by the skilled in the art referring to the FIG. 6 and FIG. 7 and the corresponding detailed introduction. In some embodiments, in order to improve efficiency, IO scanning, logic solving and communication each is executed on two or more processors.

Figure 8:
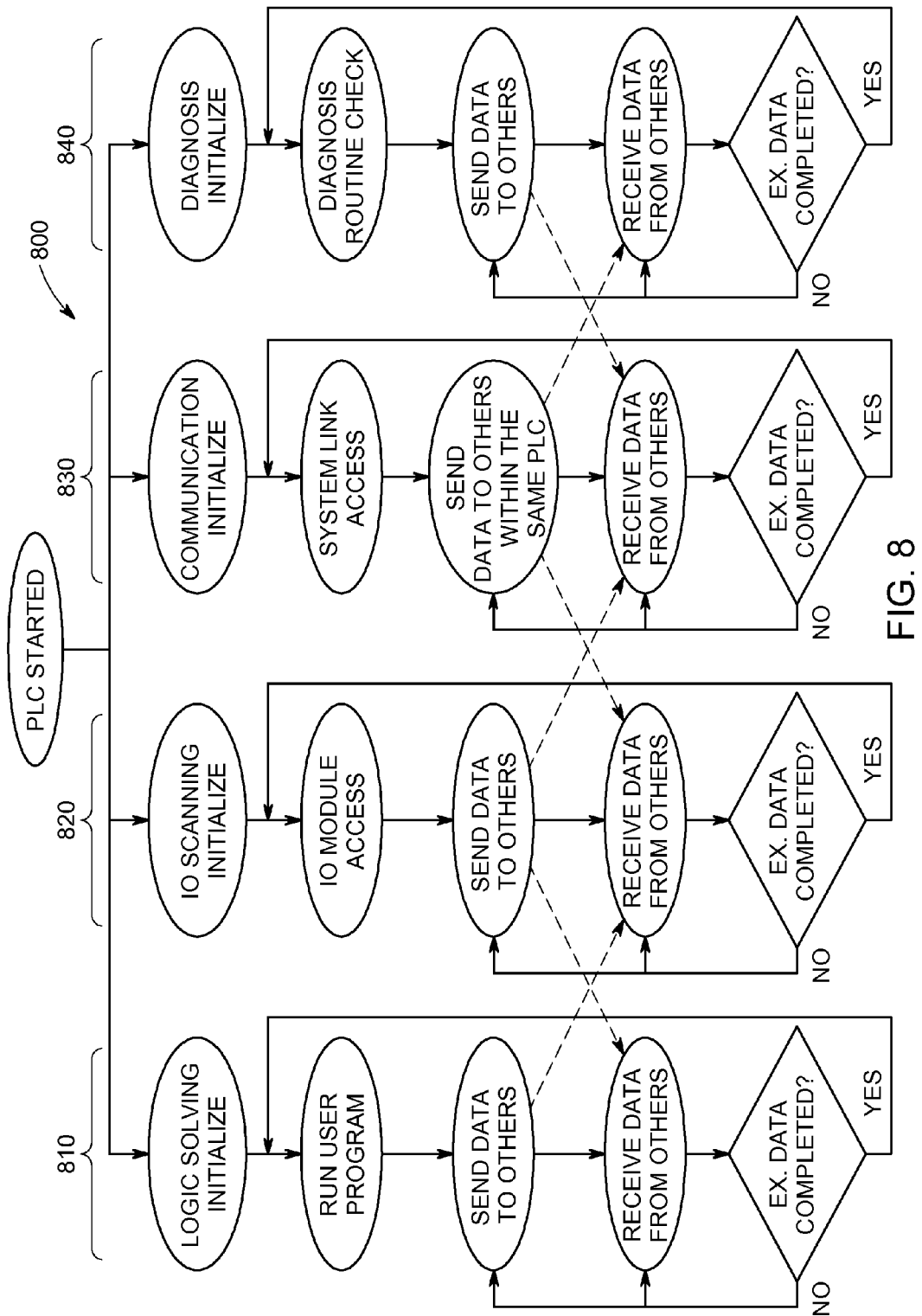
FIG. 8 is a flowchart illustrating a method of operating a PLC in accordance with another embodiment of the invention.

FIG. 8 shows a method for operating a PLC in accordance with another embodiment. In this embodiment, the PLC has four PLC functions 810, 820, 830, 840 that are run in parallel. As noted, there can be one or more processors associated with each PLC function. According to different application requirements, the number of the PLC functions can be increased or decreased. For the sake of simplicity, partial connections between PLC functions (transmitter and receiver) are not shown.

In this embodiment, once the PLC starts, the parallel processing of the four PLC functions 810, 820, 830, 840 are initiated and in one embodiment the hardware is representative of the IO scanning processor 20, the logic solving processor 30, the diagnosis processor 50 and communications processor 40 from FIG. 2. The subsequent processing steps are performed according to the switching formats detailed herein. The number of steps in the PLC function and the cycle time for the PLC function can vary, however the processing of the PLC function is performed in parallel.

Referring again to FIG. 8 and the configuration shown in FIG. 2, firstly, the PLC is started and the respective processors for each PLC functions are initialized simultaneously. Secondly, the processors 20, 30, 40 and 50 come into run phase in current sweep cycle to carry out their corresponding PLC functions: IO scanning, logic solving, communication and diagnosis.

In run phase, the IO scanning processor 20 runs system programs to have access to the IO modules 60; the logic solving processor 30 runs user programs; the communication processor 40 runs system programs to have access to the system links to communicate with other PLCs or the HMI 80; and the diagnosis processor 50 runs system programs to implements diagnosis routine check and output diagnosis information. As depicted herein, there are several switching formats. If the one synch-run switch format is applied in this PLC, the processors 20, 30, 40 and 50 respectively switch into synch phase when they finish their individual programs. If the second run-synch phase switch format is applied in this PLC, the processors 20, 30, 40 and 50 simultaneously switch into synch phase when a predefined T-max is reached. If the third run-synch phase switch format is applied in this PLC, the processors 20, 30, 40 and 50 simultaneously switch into synch phase when all processors finish their individual programs.

The processing continues and in one embodiment the processors come into synch phase. In synch phase, all processors send data to others and receive data from others.

The PLC periodically checks whether each processor has received what it requires, and whether each processor has sent out the data what other processors require (Ex. Data complete?). If the response is yes, the processors 20, 30, 40 and 50 respectively return to run phase to perform their individual programs in next sweep cycle, otherwise, they will keep exchanging data between the processors 20, 30, 40 and 50.

In some embodiments, a PLC is capable of a plurality of PLC functions and has a shared memory and a plurality of processors coupled to the shared memory via a plurality of channels. According to different application requirement, the number of the PLC functions is increased or decreased. One PLC functions may be executed on one or more processors. The shared memory has multiple program memories (PMs) for storing programs including system programs and user programs and a Ping-Pong buffer (PPB). Each processor is associated with one PM. The PPB has a first memory and a second memory having a similar space for storing input data, output data or intermediate data with the first memory.

In some embodiments, the first memory includes an arbitrator and a ping buffer; and the second memory includes an arbitrator and a pong buffer. The arbitrators test and determine access result when two or more processors simultaneously have access to one same area in the same memory and enable to the PLC functions to be run in parallel. In some embodiment, the shared memory arranges common arbitrator for the first and second memories use.

Figure 9:
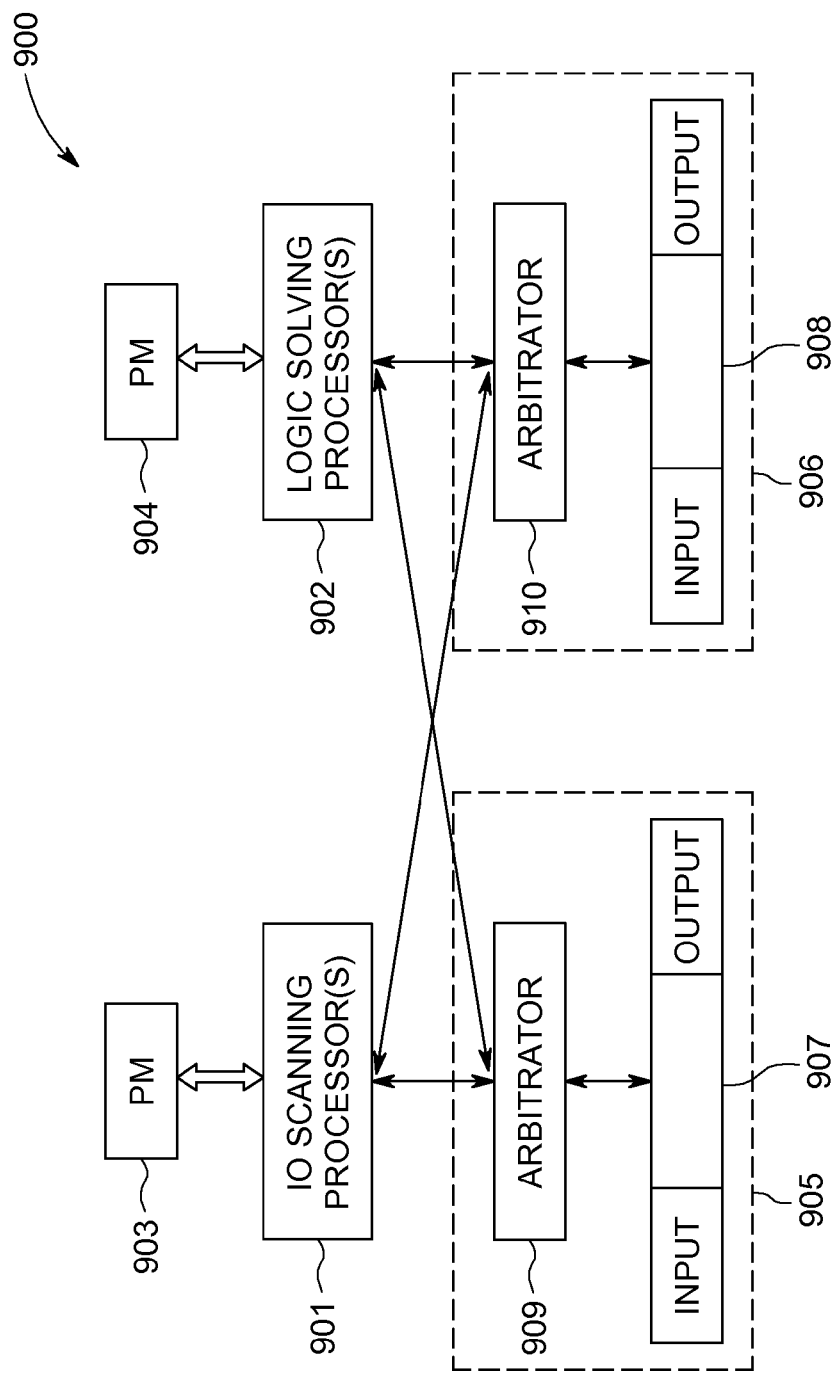
FIG. 9 is a schematic block diagram illustrating hardware architecture of a PLC in accordance with another embodiment of the invention.

FIG. 9 shows a PLC 900 having an IO scanning processor 901 and a logic solving processor 902 according to another embodiment. Within each processor 901 or 902, there may be one or more processors that also may run in parallel. The processors 901 and 902 can be portion of one or multiple processor assemblies that contain many processors.

The PLC 900 has a shared memory including two PMs 903 and 904 respectively associated with the IO scanning processor 901 and the logic solving processor 902, a first memory 905 and a second memory 906. In this embodiment, the first memory 905 has a ping buffer 907 for storing input data, output data and intermediate result and an arbitrator 909 for controlling the access to the ping buffer 907. The second memory 906 has a pong buffer 908 and an arbitrator 910. The pong buffer 908 has a similar space for storing input data, output data and intermediate data with the ping buffer 907.

The arbitrators 909 and 910 permit to access the data when the data to be accessed are located with different addresses, although they are located in the same region.

Figure 10A:
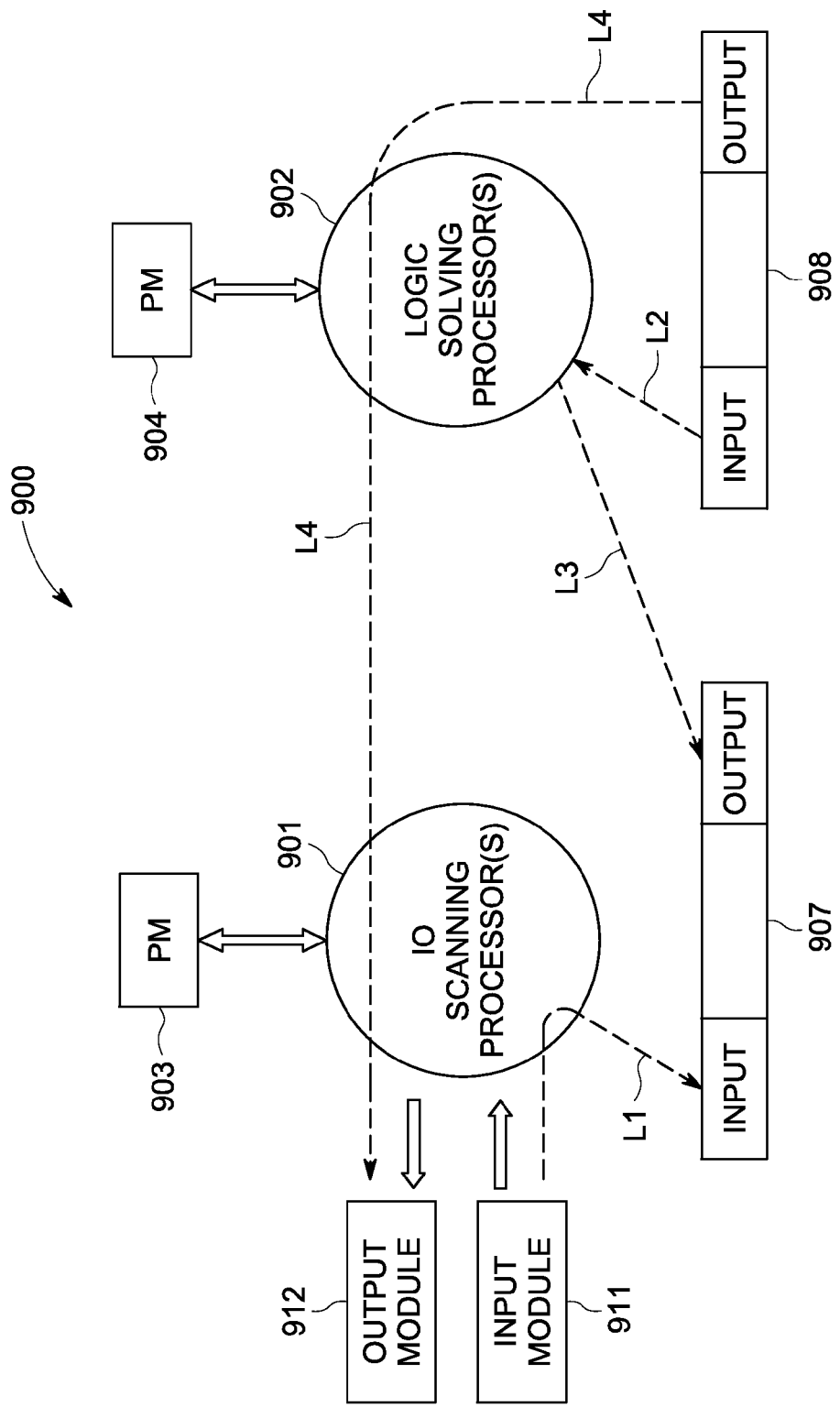
FIG. 10A is a schematic block diagram illustrating one kind of dataflow of the PLC in phase A.
Figure 10B:
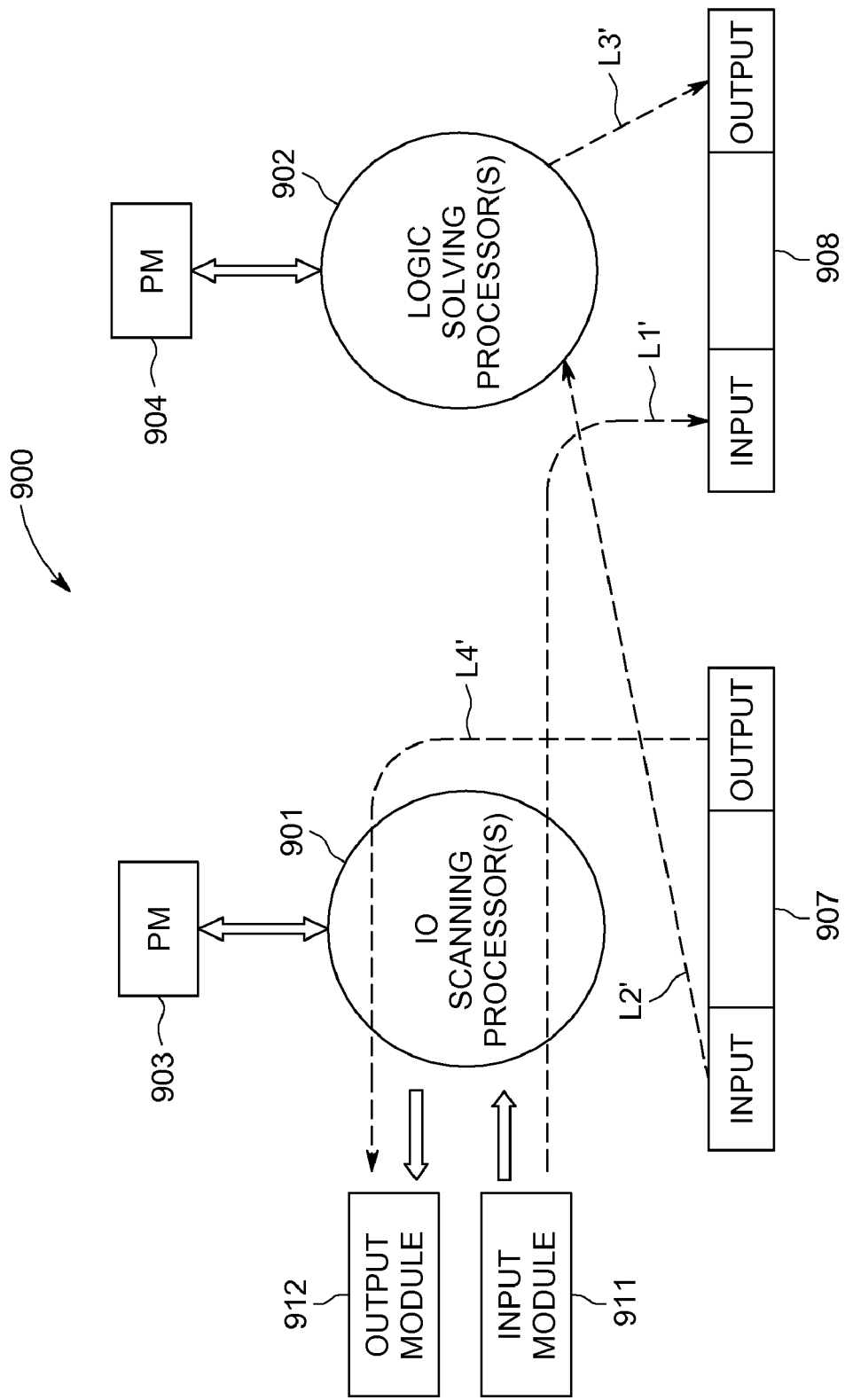
FIG. 10B is a schematic block diagram illustrating the one kind of dataflow of the PLC in phase B.

FIGS. 10A and 10B show one kind of dataflow in the PLC 900 respectively in phase A and phase B. The PLC 900 periodically performs programs in the phase A and phase B. In one sweep cycle, (see phase A in FIG. 10A), the IO scanning processor 901 and the logic solving processor 902 perform their corresponding programs in parallel. Four dataflow routes: L1, L2, L3 and L4 are illustrated in phase A. The IO scanning processor 901 executes routes L1 and L4; meanwhile, the logic solving processor 902 executes routes L2 and L3. Input data stored in input region of the ping buffer 907 through route L1 is assigned to different addresses according to a predetermined classification. When the IO scanning processor 901 and the logic solving processor 902 finish their current corresponding programs or a predetermined maximum period is reached, they switch into next sweep cycle (see phase B in FIG. 10B). The IO scanning processor 901 executes routes L1' and L4'; meanwhile, the logic solving processor 902 executes routes L2' and L3'. It is clear that the IO scanning processor 901 and the logic solving processor 902 run their individual programs in parallel. In some special applications, the IO scanning processor 901 and the logic solving processor 902 may access one same region. The arbitrators 909 and 910 in PLC 900 are triggered here to test whether the accessed destination is in the same address. If the response is yes, the arbitrators randomly choose one access first and hang on the other one. Otherwise, the IO scanning processor 901 and the logic solving processor 902 may access in parallel, which means the two PLC functions: IO scanning and logic solving are run in parallel.

For improving data integrity, a protection system (not shown) is provided in the PLC 900. From software perspective, the protection mechanism is realized by a mutex in the first or second memory 905 and 906. The mutex provides test-and-set operation and set the priority to the accesses incurred in the same time according to the predefined standards. When two or more processors simultaneously access the same address in the same area in the ping buffer 907 or the pong buffer 908. The arbitrators 909 and 910 permit the access with highest priority and hang on the others.

Figure 11:
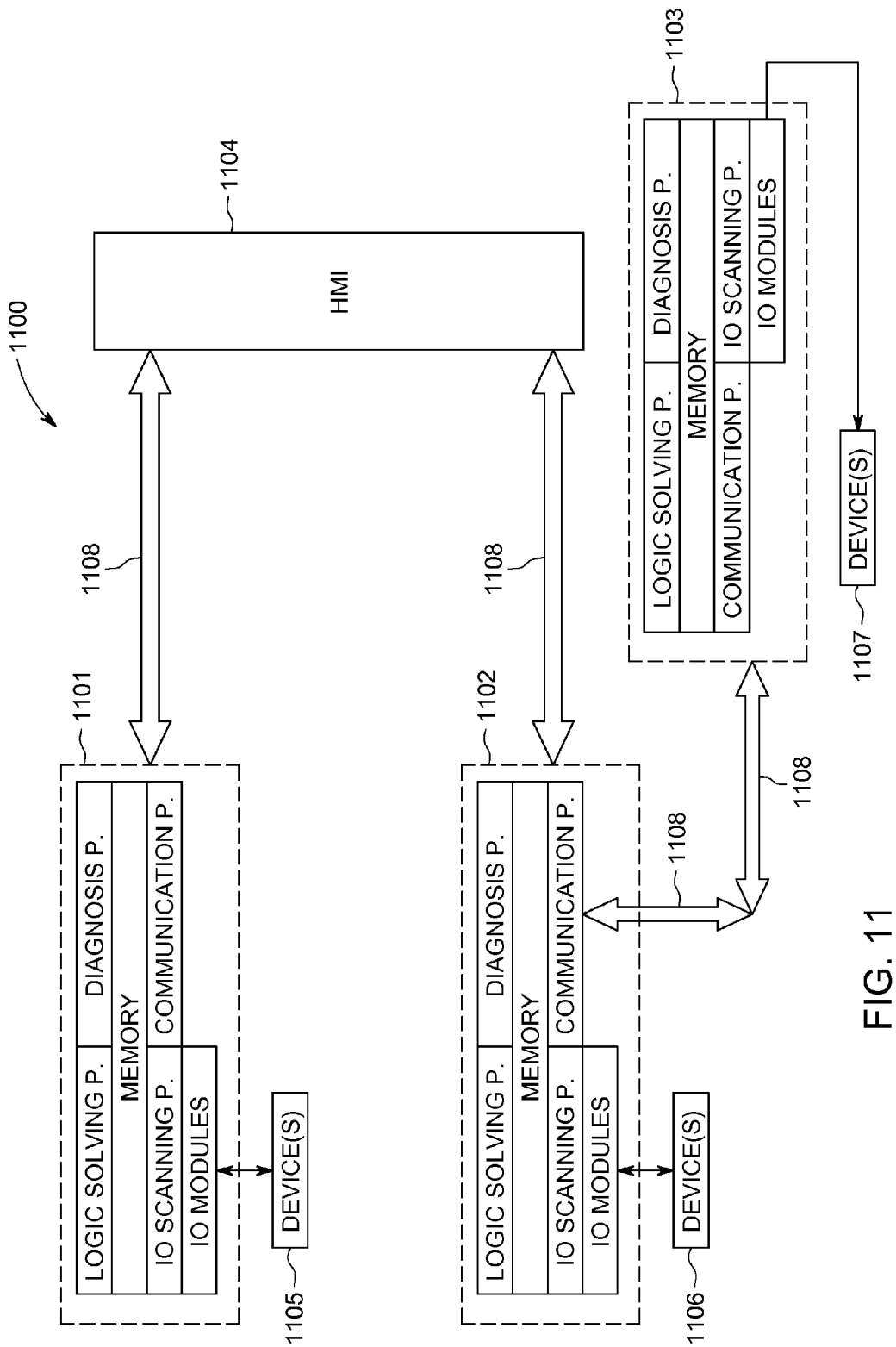
FIG. 11 is a schematic block diagram of a PLC system in accordance with another embodiment of the invention.

FIG. 11 shows a distributed PLC system 1100 in accordance with another embodiment of invention. In FIG. 11, "P." is the abbreviation of Processor. The distributed PLC system 1100 is for coupling an HMI 1104 to various devices 1105, 1106 and 1107 so that a user automatically controls the motion, process or other action of the devices 1105, 1106 and 1107 through the HMI 1104. In this embodiment, the distributed PLC system 1100 has three programmable logic controllers (PLCs) 1101, 1102 and 1103, a plurality of system links 1108 connecting the PLCs 1101, 1102 and 1103 with each other or with the HMI 1104, and a plurality of IO modules connecting PLCs 1101, 1102 and 1103 with the corresponding devices 1105, 1106 and 1107. The PLCs 1101, 1102 and 1103 are assigned to control different devices, and in alternative embodiments, they are assigned to control different parts in one device.

Each PLC 1101, 1102 or 1103 is capable of a plurality of PLC functions and has a memory for storing system programs and user programs and a plurality of processors. Each PLC function is assigned to one or more processors. In some embodiments, the PLCs 1101, 1102 and 1103 are replaced by any PLC of the above-mentioned embodiments according to the application. In this embodiment, each PLC includes an IO scanning processor, a logic solving processor, a communication processor and a diagnosis processor. Within each processor, there may be one or more processors that also may run in parallel. The processors can be portion of one or multiple processor assemblies that contain many processors.

The IO scanning processor executes the corresponding system programs to scan the coupled device 1105, 1106 or 1107. The logic solving processor executes user programs to process logic computation. The communication processor performs the corresponding system programs and cooperates with the system link 1108 to establish a communication between two PLCs or one PLC and the HMI 1104. In operation, the diagnosis processor executes the corresponding system programs and performs diagnosis routine check to produce diagnosis result and send them to other processors.

In each PLC 1101, 1102 or 1103, the PLC functions are run in parallel. The detail of the configuration of each PLC is referred to in the above-mentioned embodiments of PLC. The PLC shown in FIGS. 9, 10A and 10B is also used here so that the PLC functions are run in parallel.

The communication processor in each PLC is responsible for establishing communication between any two PLCs or between one PLC and the HMI 1104. One PLC's operation sometimes relies on the data required from other PLCs. The communication processor continuously sends and receives updated data or requests from others with the system links 1108. In some embodiments, the memory has a system input domain and a system output domain to be dedicated for placing data received/sent through the system links 1108. In this embodiment, the system link 1108 is realized by low voltage differential signal (LVDS). If the PLC system transfers large amount of data, an industrial Ethernet protocol may be applied here.

In programming, all programs are programmed in the distributed PLC system 600 using one compiler (not shown) through the HMI or other computer 1104. The compiler records all the information of each PLC 1101, 1102 or 1103 including hardware and software information. The compiler specifies the processors in each PLC 1101, 1102 or 1103 and creates system links automatically. Compared with the conventional programming method which is first programming each PLC and then connecting them together, the configuration of the invention make it is easier to program. Also, it enables the user to easily scale up the PLC system by inserting additional PLC according to the application.

The above-mentioned multiple processors in a PLC or in one of PLC in a PLC system may be placed on multiple chips. For example, a PLC having multiple processors may include two chips, and one chip places one processor or more processors. Also, all of the processors are placed on one chip provided that the integrity performance meets the application.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A programmable logic controller (PLC) capable of a plurality of PLC functions, comprising:
   one or more processors assigned to each of the PLC functions;
   at least one memory coupled to the one or more processors and storing at least one of a plurality of programs or data; and a plurality of channels connecting the one or more processors corresponding to each of the PLC functions to enable the one or more processors to communicate with each other;

wherein at least two of the PLC functions are run in parallel.

2. The PLC of claim 1, wherein the at least one memory comprises a plurality of first and second memories each of which is directly associated with one PLC function; and wherein the first memories place the programs and intermediate results and the second memories place dataflow variables during communications among the one or more processors.

3. The PLC of claim 2, further comprising a plurality of channels respectively connecting the second memories with the one or more processors corresponding to corresponding one or more processors indirectly associated PLC functions.

4. The PLC of claim 1, wherein the one or more processors periodically cycle through a synch phase and a run phase; and wherein the one or more processors corresponding to each of the PLC functions exchange data to each other in the synch phase and execute the programs stored in the memory in the run phase.

5. The PLC of claim 4, wherein the one or more processors simultaneously switch into the synch phase from the run phase when all of the one or more processors finish the corresponding at least one of the plurality of programs.

6. The PLC of claim 4, wherein the one or more processors simultaneously switch into the synch phase from the run phase when a predefined maximum time period is reached.

7. The PLC of claim 1, wherein the at least one memory comprises a plurality of program memories wherein each of the program memories is associated with one PLC function and a ping-pong buffer which comprises a first memory and a second memory.

8. The PLC of claim 7, wherein the one or more processors comprise an IO scanning processor and a logic solving processor which alternately have access to the first memory and the second memory.

9. The PLC of claim 7, further comprising two arbitrators respectively connecting the first memory and the second memory with the one or more processors and controlling the one or more processors to access the first memory or the second memory.

10. The PLC of claim 9, further comprising a protection mechanism connected with the two arbitrators; wherein the protection mechanism sets priority to the one or more processors when two or more processors have access to one same area of the first memory or the second memory.

11. The PLC of claim 7, wherein the first memory is a ping buffer and the second memory is a pong buffer; and wherein the ping buffer and the pong buffer have similar spaces for storing input data and output data.

12. A method of operating a programmable logic controller (PLC) capable of a plurality of PLC functions, the PLC comprising: at least one memory storing at least one of a plurality of programs or data; and one or more processors assigned to each of the PLC function and coupled to the memory, the method comprising:
(a) initializing the one or more processors corresponding to each of the PLC functions simultaneously;
(b) running the PLC functions in parallel by using the one or more processors to execute the at least one of the plurality of corresponding programs in current sweep cycle;
(c) exchanging data in parallel by using the one or more processors in current sweep cycle;
(d) switching the one or more processors to step (b) in next sweep cycle to periodically perform steps (b), (c) and (d) until the one or more processors respectively finish all required programs.

13. The method of claim 12, wherein the at least one memory comprises a plurality of first and second memories wherein each of the first and second memories is associated with one PLC function; and wherein the method further comprises placing storing intermediate results produced during step (b) in the first memory and placing storing dataflow variable from other processors in the second memory during step (c).

14. The method of claim 12, wherein during step (d) switching all of the one or more processors simultaneously to step (b) in the next sweep cycle when a predefined maximum period is reached.

15. The method of claim 12, wherein during step (d) switching all of the one or more processors simultaneously to step (b) in the next sweep cycle when all of the one or more processors complete the at least one of the plurality of corresponding programs in current sweep cycle.

16. A programmable logic controller (PLC) system, comprising:
a plurality of programmable logic controllers (PLCs) each of which is capable of a plurality of PLC functions;
a plurality of system links connecting the PLCs; and
a plurality of IO modules connecting the PLCs with one or more devices;
each PLC comprising:
one or more processors assigned to each of the plurality of PLC functions, wherein the one or more processors comprises a plurality of logic solving processors; and
at least one memory coupled to the one or more processors and storing at least one of a plurality of programs or data;
wherein at least two of the PLC functions are run in parallel.

17. The PLC system of claim 16, wherein the plurality of system links are low voltage differential signals (LVDS).

18. The PLC system of claim 16, wherein each of the plurality of PLC comprises a plurality of channels connecting the one or more processors corresponding to each of the plurality of PLC functions to enable the one or more processors to communicate with each other.

19. The PLC system of claim 16, wherein the memory comprises a plurality of first and second memories wherein each of the first and second memories is associated with one PLC function; and wherein the first memories store the programs and intermediate results and the second memories store dataflow variables during communications among the one or more processors.

20. The PLC system of claim 19, wherein the second memories further comprise a system input domain and a system output domain dedicated to respectively store data transmitted through the plurality of system links.

21. The PLC system of claim 16, wherein the memory comprises a plurality of program memories wherein each of the plurality of program memories is associated with one PLC function and a ping-pong buffer which comprises a first memory and a second memory having the same spaces for storing input data and output data as the first memory.

22. The PLC system of claim 21, wherein the ping-pong buffer comprises two arbitrators respectively connecting the first memory and the second memory with the one or more processors; and wherein the two arbitrators control the processors to access the first memory or the second memory.

* * * * *